United States Patent
Khodykin

(10) Patent No.: US 11,317,500 B2
(45) Date of Patent: Apr. 26, 2022

(54) BRIGHT AND CLEAN X-RAY SOURCE FOR X-RAY BASED METROLOGY

(71) Applicant: KLA—Tencor Corporation, Milpitas, CA (US)

(72) Inventor: Oleg Khodykin, Santa Cruz, CA (US)

(73) Assignee: KLA-Tencor Corporation, Milpitas, CA (US)

(*) Notice: Subject to any disclaimer, the term of this patent is extended or adjusted under 35 U.S.C. 154(b) by 210 days.

(21) Appl. No.: 16/112,762

(22) Filed: Aug. 26, 2018

(65) Prior Publication Data

US 2019/0069385 A1    Feb. 28, 2019

Related U.S. Application Data

(60) Provisional application No. 62/551,785, filed on Aug. 30, 2017.

(51) Int. Cl.
*H05G 2/00* (2006.01)
*G01N 23/20008* (2018.01)
*G01N 23/201* (2018.01)

(52) U.S. Cl.
CPC .......... *H05G 2/008* (2013.01); *G01N 23/201* (2013.01); *G01N 23/20008* (2013.01); *H05G 2/006* (2013.01)

(58) Field of Classification Search
CPC ... H05G 2/008; H05G 2/006; G01N 23/20008
See application file for complete search history.

(56) References Cited

U.S. PATENT DOCUMENTS 5,608,526 A    3/1997  Piwonka-Corle et al.
5,859,424 A    1/1999  Norton et al.
(Continued)

FOREIGN PATENT DOCUMENTS

JP    2008277204 A    11/2008
JP    6121414 B2    4/2017
(Continued)

OTHER PUBLICATIONS

Hemberg "Compact Liquid-Jet X-ray Sources", Royal Institute of Technology, 2004, p. 1-85. (Year: 2004).*
(Continued)

*Primary Examiner* — David P Porta
*Assistant Examiner* — Mamadou Faye
(74) *Attorney, Agent, or Firm* — Spano Law Group; Joseph S. Spano

(57) ABSTRACT

Methods and systems for x-ray based semiconductor metrology utilizing a clean, hard X-ray illumination source are described herein. More specifically, a laser produced plasma light source generates high brightness, hard x-ray illumination having energy in a range of 25,000 to 30,000 electron volts. To achieve high brightness, a highly focused, very short duration laser beam is focused onto a dense Xenon target in a liquid or solid state. The interaction of the focused laser pulse with the high density Xenon target ignites a plasma. Radiation from the plasma is collected by collection optics and is directed to a specimen under measurement. The resulting plasma emission is relatively clean because of the use of a non-metallic target material. The plasma chamber is filled with Xenon gas to further protect optical elements from contamination. In some embodiments, evaporated Xenon from the plasma chamber is recycled back to the Xenon target generator.

19 Claims, 3 Drawing Sheets

(56) References Cited

U.S. PATENT DOCUMENTS

| | | | |
|---|---|---|---|
| 6,023,338 A | 2/2000 | Bareket | |
| 6,429,943 B1 | 8/2002 | Opsal et al. | |
| 6,716,646 B1 | 4/2004 | Wright et al. | |
| 6,778,275 B2 | 8/2004 | Bowes | |
| 6,787,773 B1 | 9/2004 | Lee | |
| 6,992,764 B1 | 1/2006 | Yang et al. | |
| 7,242,477 B2 | 7/2007 | Mieher et al. | |
| 7,321,426 B1 | 1/2008 | Poslavsky et al. | |
| 7,351,980 B2 | 4/2008 | Lange | |
| 7,406,153 B2 | 7/2008 | Berman | |
| 7,478,019 B2 | 1/2009 | Zangooie et al. | |
| 7,491,954 B2 | 2/2009 | Bykanov et al. | |
| 7,599,470 B2 | 11/2009 | Diethard et al. | |
| 7,626,702 B2 | 12/2009 | Ausschnitt et al. | |
| 7,656,528 B2 | 2/2010 | Abdulhalim et al. | |
| 7,705,331 B1 | 4/2010 | Kirk et al. | |
| 7,732,793 B2 | 6/2010 | Ershov et al. | |
| 7,826,071 B2 | 11/2010 | Shchegrov et al. | |
| 7,842,933 B2 | 11/2010 | Shur et al. | |
| 7,873,585 B2 | 1/2011 | Izikson | |
| 7,929,667 B1 | 4/2011 | Zhuang et al. | |
| 7,933,026 B2 | 4/2011 | Opsal et al. | |
| 8,068,662 B2 | 11/2011 | Zhang et al. | |
| 8,138,498 B2 | 3/2012 | Ghinovker | |
| 8,633,459 B2 | 1/2014 | Bykanov et al. | |
| 9,506,871 B1 | 11/2016 | Flock | |
| 9,544,984 B2* | 1/2017 | Bykanov | G03F 7/70891 |
| 9,612,370 B1* | 4/2017 | Johnson | G02B 19/0095 |
| 9,693,439 B1 | 6/2017 | Zhuang et al. | |
| 9,915,522 B1 | 3/2018 | Jiang et al. | |
| 2002/0015473 A1* | 2/2002 | Hertz | H05G 2/003 378/143 |
| 2002/0044629 A1* | 4/2002 | Hertz | H05G 2/006 378/119 |
| 2003/0021465 A1 | 1/2003 | Adel et al. | |
| 2003/0067598 A1 | 4/2003 | Tomie et al. | |
| 2004/0170252 A1 | 9/2004 | Richardson | |
| 2005/0147147 A1* | 7/2005 | Umstadter | H01S 3/30 372/73 |
| 2006/0103725 A1 | 5/2006 | Brown et al. | |
| 2007/0221842 A1 | 9/2007 | Morokuma et al. | |
| 2007/0228288 A1 | 10/2007 | Smith et al. | |
| 2009/0152463 A1 | 6/2009 | Toyoda et al. | |
| 2010/0188655 A1 | 7/2010 | Brown et al. | |
| 2010/0188738 A1 | 7/2010 | Epple et al. | |
| 2010/0213395 A1 | 8/2010 | Ueno et al. | |
| 2011/0141865 A1 | 6/2011 | Senekerimyan et al. | |
| 2011/0240890 A1 | 11/2011 | Govindaraju et al. | |
| 2011/0266440 A1 | 11/2011 | Boughorbel et al. | |
| 2012/0292502 A1 | 11/2012 | Langer et al. | |
| 2013/0208279 A1 | 8/2013 | Smith | |
| 2013/0304424 A1 | 11/2013 | Bakeman et al. | |
| 2014/0019097 A1 | 1/2014 | Bakeman et al. | |
| 2014/0048099 A1 | 2/2014 | Partlo et al. | |
| 2014/0111791 A1 | 4/2014 | Manassen et al. | |
| 2014/0172394 A1 | 6/2014 | Kuznetsov et al. | |
| 2014/0222380 A1 | 8/2014 | Kuznetsov et al. | |
| 2014/0297211 A1 | 10/2014 | Pandev et al. | |
| 2014/0306115 A1 | 10/2014 | Kuritsyn et al. | |
| 2015/0076359 A1 | 3/2015 | Bykanov et al. | |
| 2015/0102239 A1 | 4/2015 | Yanagida et al. | |
| 2015/0110249 A1 | 4/2015 | Bakeman et al. | |
| 2015/0117610 A1 | 4/2015 | Veldman et al. | |
| 2015/0285749 A1 | 10/2015 | Moncton et al. | |
| 2015/0300965 A1 | 10/2015 | Sezginer et al. | |
| 2016/0128171 A1 | 5/2016 | Kuritsyn et al. | |
| 2016/0202193 A1 | 7/2016 | Hench et al. | |
| 2016/0268120 A1 | 9/2016 | Bezel et al. | |
| 2017/0047191 A1 | 2/2017 | Yun et al. | |
| 2017/0131129 A1 | 5/2017 | Ahr et al. | |
| 2017/0142817 A1 | 5/2017 | Kuritsyn et al. | |
| 2017/0167862 A1 | 6/2017 | Dziura et al. | |
| 2017/0365766 A1* | 12/2017 | Boukai | G04G 17/04 |
| 2018/0106735 A1 | 4/2018 | Gellineau et al. | |
| 2018/0220518 A1* | 8/2018 | Polyakov | H05G 2/00 |

FOREIGN PATENT DOCUMENTS

| | | |
|---|---|---|
| WO | 2009018244 A1 | 2/2009 |
| WO | 2010148293 A2 | 12/2010 |
| WO | 2017063839 A1 | 4/2017 |

OTHER PUBLICATIONS https://www.bruker.com/products/x-ray-diffraction-and-elemental-analysis/small-angle-x-ray-scattering.html.
https://www.rigaku.com/en/products/saxs.
http://www.xenocs.com/en/solutions/nano-inxider-saxs-made-easy/.
International Search Report dated Dec. 14, 2018, for PCT Application No. PCT/US2018/048530 filed on Aug. 29, 2018 by KLA-Tencor Corporation, 5 pages.

* cited by examiner

BRIGHT AND CLEAN X-RAY SOURCE FOR X-RAY BASED METROLOGY

TECHNICAL FIELD

The described embodiments relate to x-ray laser produced plasma radiation sources and systems for x-ray metrology and inspection.

BACKGROUND INFORMATION

Semiconductor devices such as logic and memory devices are typically fabricated by a sequence of processing steps applied to a substrate or wafer. The various features and multiple structural levels of the semiconductor devices are formed by these processing steps. For example, lithography among others is one semiconductor fabrication process that involves generating a pattern on a semiconductor wafer. Additional examples of semiconductor fabrication processes include, but are not limited to, chemical-mechanical polishing, etch, deposition, and ion implantation. Multiple semiconductor devices may be fabricated on a single semiconductor wafer and then separated into individual semiconductor devices.

Metrology processes are used at various steps during a semiconductor manufacturing process to detect defects on wafers to promote higher yield. A number of metrology based techniques including scatterometry and reflectometry implementations and associated analysis algorithms are commonly used to characterize critical dimensions, overlay, film thicknesses, composition and other parameters of nanoscale structures.

Traditionally, measurements are performed on targets consisting of thin films and/or repeated periodic structures. During device fabrication, these films and periodic structures typically represent the actual device geometry and material structure or an intermediate design. As devices (e.g., logic and memory devices) move toward smaller nanometer-scale dimensions, characterization becomes more difficult. Devices incorporating complex three-dimensional geometry and materials with diverse physical properties contribute to characterization difficulty. For example, modern memory structures are often high-aspect ratio, three-dimensional structures that make it difficult for optical radiation to penetrate to the bottom layers. Optical metrology tools utilizing infrared to visible light can penetrate many layers of translucent materials, but longer wavelengths that provide good depth of penetration do not provide sufficient sensitivity to small anomalies. In addition, the increasing number of parameters required to characterize complex structures (e.g., FinFETs), leads to increasing parameter correlation. As a result, the parameters characterizing the target often cannot be reliably decoupled with available measurements.

In one example, opaque, high-k materials are increasingly employed in modern semiconductor structures. Optical radiation is often unable to penetrate layers constructed of these materials. As a result, measurements with thin-film scatterometry tools such as ellipsometers or reflectometers are becoming increasingly challenging.

In response to these challenges, more complex optical metrology tools have been developed. For example, tools with multiple angles of illumination, shorter illumination wavelengths, broader ranges of illumination wavelengths, and more complete information acquisition from reflected signals (e.g., measuring multiple Mueller matrix elements in addition to the more conventional reflectivity or ellipsometric signals) have been developed. However, these approaches have not reliably overcome fundamental challenges associated with measurement of many advanced targets (e.g., complex 3D structures, structures smaller than 10 nm, structures employing opaque materials) and measurement applications (e.g., line edge roughness and line width roughness measurements).

Small-angle X-Ray Scatterometry (SAXS) has been applied to the characterization of materials and other non-semiconductor related applications. Exemplary systems have been commercialized by several companies, including Xenocs SAS (www.xenocs.com), Bruker Corporation (www.bruker.com), and Rigaku Corporation (www.rigaku.com/en).

In addition, SAXS based metrology systems have shown promise to address challenging measurement applications, such as critical dimension metrology and overlay metrology. In particular, transmissive small angle x-ray scatterometry (T-SAXS) has shown promise in challenging critical dimension and overlay applications. However, reliable hard X-ray illumination sources suitable for T-SAXS based metrology remain under development.

In some examples, illumination light is provided by classical x-ray tubes, such as rotating anode x-ray tubes, which employ high energy electron beam bombardment of a solid target material to generate x-ray emission. Unfortunately, the resulting illumination is low brightness due to heating and evaporation of anode material by the high energy electron beam.

In some other examples, a liquid metal jet anode is employed to mitigate the problem of surface evaporation. An exemplary liquid metal jet x-ray illumination system is described in U.S. Pat. No. 7,929,667 to Zhuang and Fielden, the content of which is incorporated herein by reference in its entirety. The liquid metal jet effectively refreshes the anode surface continuously to reduce absorption of X-rays at the surface. However, the liquid metal anode material does evaporate and form a metal vapor that may limit x-ray source lifetime. In some examples, the metal vapor condenses on the vacuum x-ray window causing additional x-ray absorption. In some examples, the metal vapor diffuses into the cathode region and contaminates the cathode, reducing cathode lifetime and system output. In some examples, the metal vapor diffuses into the electron beam acceleration region causing high-voltage breakdowns.

In some examples, illumination light is provided by a light source pumped by a continuous wavelength laser (e.g., laser sustained plasma). Laser sustained plasmas are produced in high pressure bulbs surrounded by a working gas at lower temperature than the laser plasma. While substantial radiance improvements are obtained with laser sustained plasmas, the temperature of these plasmas is generally limited by the photophysical and kinetic processes within these lamps. Pure atomic and ionic emission in these plasmas is generally confined to wavelengths longer than 200 nm. Excimer emission can be arranged in laser sustained plasmas for wavelength emission at 171 nm (e.g., xenon excimer emission), but these sources are typically narrow band, limited in power, and limited in radiance. Excimer emission at 171 nanometers optimizes at low pressures (e.g., 3 bar and below), and the power of 171 nm emission is greatly diminished at higher pressures needed for high radiance. As a consequence, a simple gas mixture in a high pressure bulb is only able to sustain wavelength coverage above 200 nm with sufficient radiance and average power to support high throughput, high resolution metrology. In some examples, solid electrode targets are employed, but low repetition rate, electrode erosion, and large plasma size result in low brightness and short lifetime, limiting their effectivity for x-ray based semiconductor metrology.

Development efforts in the area of extreme ultraviolet (EUV) lithography are focused on light sources that emit narrowband radiation (e.g., +/−0.1 nm) centered at 13 nanometers at high power levels (e.g., 210 watts of average power at the intermediate focus of the illuminator). Light sources for EUV lithography have been developed using a laser droplet plasma architecture. For example, xenon, tin, and lithium droplet targets operating at pulse repetition frequencies of approximately 100 kHz are pumped by CO2 coherent sources. The realized light is high power (e.g., 210 watts of average power at the intermediate focus of the illuminator is the goal for lithography tools at 13 nanometers). However, the resulting radiation is relatively low energy (92.6 electron volts), which severely limits the utility of these illumination sources in metrology applications.

Clean, hard X-ray illumination sources with the required radiance and average power for metrology applications are desired.

SUMMARY

Methods and systems for x-ray based semiconductor metrology utilizing a clean, hard X-ray illumination source are described herein. More specifically, a laser produced plasma (LPP) light source generates high brightness (i.e., greater than $10^{13}$ photons/(sec·'mm²·mrad²) hard x-ray illumination having energy in a range of 25,000 to 30,000 electron volts. To achieve such high brightness, the LPP light source directs a highly focused, very short duration laser beam to a dense Xenon target in a liquid or solid state. The interaction of the focused laser pulse with the high density Xenon target ignites a plasma. Radiation from the plasma is collected by collection optics and is directed to a specimen under measurement. The resulting plasma emission is relatively clean because of the use of a non-metallic target material. As a result, the plasma chamber and optical elements within the plasma chamber are subject to very low levels of contamination due to the plasma.

In one aspect, Xenon target material in a liquid or solid state is illuminated by a laser spot size of less than 10 micrometers with a pulse duration of less than two picoseconds such that the laser peak energy density at the target material is greater than 10^16 W/cm^2. This enables efficient K-alpha generation from the Xenon target material. The resulting K-alpha production generates plasma illumination energy at the narrow, resonant K-alpha line of Xenon, which is centered at 29,802 electron volts.

In some embodiments, a droplet generator generates a sequence of droplets of liquid or solid Xenon that are illuminated by one or more pulsed laser illumination sources. In some other embodiments, the Xenon target material is provided to the focal point of the laser illumination light as a solid Xenon layer disposed on a cryogenically cooled rotating drum. In these embodiments, the cryogenically cooled drum is continuously rotated to deliver solid Xenon target material to the focal point of the laser illumination light.

In some embodiments, light pulses from multiple pulsed laser sources are emitted simultaneously. In some other embodiments, light pulses from multiple pulsed laser sources are emitted sequentially. In some embodiments, the wavelength of emission from any of the pulsed lasers is approximately one micrometer or less. In some embodiments, the total average power of each pulsed laser is approximately one kilowatt or less.

In a further aspect, a plasma chamber is filled with Xenon gas maintained at a pressure in a range between 5 and 200 Torr. Maintaining the Xenon gas within this pressure range provides a suitable environment for Xenon droplet formation. Furthermore, Xenon buffer gas maintained at a pressure in a range between 5 and 200 Torr thermalizes energetic Xenon ions and electrons generated by the plasma including substantially all Xenon ions generated by the plasma within a distance of approximately 10 centimeters.

In another further aspect, the LPP light source includes a gas recycle system that recycles evaporated Xenon from the plasma chamber back to the Xenon target generator.

The foregoing is a summary and thus contains, by necessity, simplifications, generalizations and omissions of detail; consequently, those skilled in the art will appreciate that the summary is illustrative only and is not limiting in any way. Other aspects, inventive features, and advantages of the devices and/or processes described herein, as defined solely by the claims, will become apparent in the non-limiting detailed description set forth herein.

DETAILED DESCRIPTION

Reference will now be made in detail to background examples and some embodiments of the invention, examples of which are illustrated in the accompanying drawings.

Methods and systems for x-ray based semiconductor metrology utilizing a clean, hard X-ray illumination source are described herein. More specifically, a laser produced plasma (LPP) light source generates high brightness (i.e., greater than $10^{13}$ photons/(sec·mm²·mrad²) hard x-ray illumination having energy in a range of 25,000 to 30,000 electron volts. To achieve such high brightness, the LPP light source directs a highly focused (e.g., less than 10 micrometer illumination spot on target), very short duration (e.g., less than 2 picoseconds) laser beam to a dense Xenon target in a liquid or solid state. The interaction of the focused laser pulse with the high density Xenon target ignites a plasma. Radiation from the plasma is collected by collection optics and is directed to a specimen under measurement. The resulting plasma emission is relatively clean because of the use of a non-metallic target material. As a result, the plasma chamber and optical elements within the plasma chamber are subject to very low levels of contamination due to the plasma.

Figure 1:
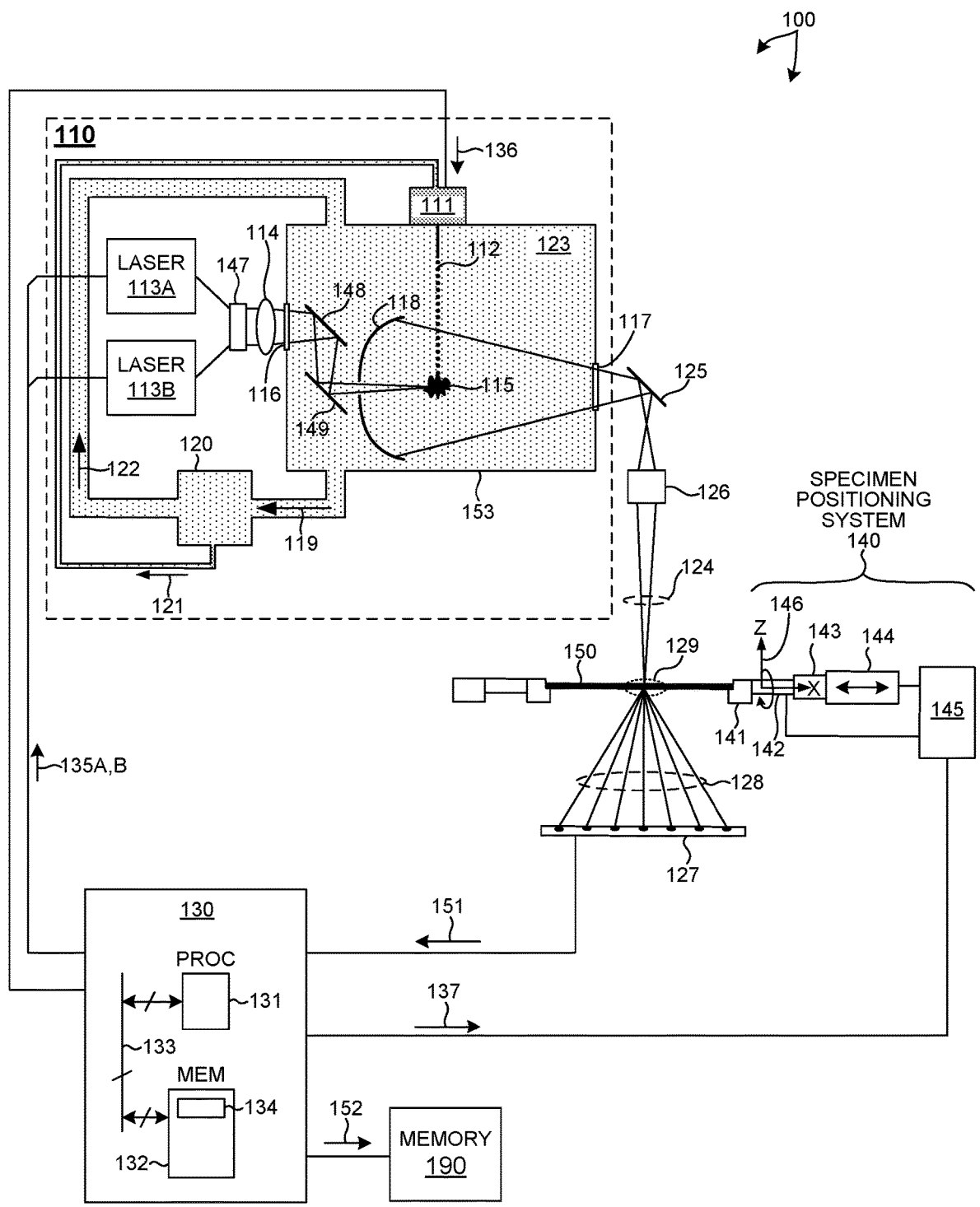
FIG. 1 is a simplified diagram illustrative of a metrology system including a laser produced plasma (LPP) light source in at least on novel aspect.

FIG. 1 depicts an x-ray based metrology system 100 including a laser produced plasma (LPP) light source 110 in at least one novel aspect. LPP light source 110 includes a plasma chamber 153, droplet generator 111, and pulsed laser illumination sources 113A and 113B. Plasma chamber 153 includes one or more walls that contain a flow of buffer gas 123 within the plasma chamber. Droplet generator 111 dispenses a sequence of droplets of a non-metallic feed material 112 into plasma chamber 153.

In one aspect, the Xenon droplets generated by droplet generator 111 are in a solid or liquid state in plasma chamber 153. In another aspect, each droplet of non-metallic feed material 112 is less than 50 micrometers in diameter. In yet another aspect, the laser spot incident on the Xenon target is less than 10 micrometers in diameter. In some embodiments, droplet generator 111 is a high frequency fluid dispenser based on commercially available ink jet technology. In one example, droplet generator 111 dispenses a sequence of droplets of feed material 112 at a rate between 50 and 400 kilohertz.

In a further aspect, the duration of each pulse of excitation light provided to the target material is less than two picoseconds. In some embodiments, the duration of each pulse of excitation light is less than one picosecond.

As described herein, high energy, high peak power, picosecond laser illumination results in a laser peak energy density at the target material that is greater than $10^{16}$ W/cm^2. This enables efficient K-alpha generation from the Xenon target material (e.g., greater than $10^{-5}$). The resulting K-alpha production generates plasma illumination energy at the narrow, resonant K-alpha line of Xenon, which is centered at 29,802 electron volts.

As depicted in FIG. 1, pulsed lasers 113A and 113B generate a sequence of pulses of excitation light. Each pulse of excitation light is directed to a droplet of feed material 112. Beam combiner 147 combines the light output of pulsed lasers 113A and 113B for delivery to the plasma chamber 153. In some embodiments, beam combiner 147 provides beam conditioning to further optimize focusing of the laser illumination at the target material (e.g., beam expansion, collimation, etc.). The excitation light is focused by illumination optics 114 onto the droplets over a very small spot size. In some embodiments, the excitation light is focused onto the droplets with a spot size of less than 10 micrometers. In a preferred embodiment, the excitation light is focused onto the droplets with a spot size of less than 5 micrometers. Laser light having a quality factor, $M^2$, less than 1.3 is focused to a spot size of less than 10 micrometers with relatively small numerical aperture (NA). Thus, complex, high NA optics are not required.

As the spot size of the excitation light decreases, the spot size of the induced plasma decreases. In a preferred embodiment, the spot size of plasma 115 is less than 10 micrometers.

As depicted in FIG. 1, the laser illumination beam is introduced to plasma chamber 153 through illumination window 116. In addition, one or more additional optical elements (e.g., metal optics 148 and 149) direct the laser illumination beam to the target, but do not reflect x-ray radiation produced by plasma 115 back through illumination window 116. Back reflection of x-ray radiation through illumination window 116 potentially poses a safety risk and also material degradation of illumination window 116 that affects system operation. In one embodiment, the final metal optical element 149 is arranged in a non-normal incidence configuration, a non-grazing incidence configuration, or both, to avoid backward reflection of x-ray radiation.

In some embodiments, light pulses from multiple pulsed laser sources are emitted simultaneously. In some other embodiments, light pulses from multiple pulsed laser sources are emitted sequentially. As depicted in FIG. 1, computing system 130 communicates control signal 135A to pulsed laser 113A and control signal 135B to pulsed laser 113B. In one example, control signals 135A and 135B cause pulsed lasers 113A and 113B to each emit a pulse of laser light at the same time. In this example, the emitted pulses are combined simultaneously and delivered to the target as a combined pulse. By simultaneously delivering pulses of laser light from multiple pulsed lasers, the illumination power provided to the target is effectively increased. In another example, control signals 135A and 135B cause pulsed lasers 113A and 113B to each emit a pulse of laser light sequentially in time such that only one pulse emission occurs at any given time, and the interval between pulses generated by different pulsed lasers is constant. In this example, the emitted pulses are delivered sequentially to the target. By sequentially delivering pulses of laser light from multiple pulsed lasers, the repetition rate of the laser illumination provided to the target is effectively increased.

As depicted in FIG. 1, LPP source 110 includes two pulsed lasers 113A and 113B. However, in general, a LPP source 110 may include any number of pulsed laser illumination sources (e.g., one laser or many lasers). Moreover, when multiple pulsed laser sources are employed, the emission of any of the pulsed laser sources may be delivered sequentially, simultaneously, or both, to deliver illumination light to the target at a desired optical power and repetition rate. For example, two sets of two pulsed lasers may be controlled such that the first set of two pulsed lasers emit light simultaneously and the second set of two pulsed lasers also emit light simultaneously, while the first set and the second set emit light sequentially. In general, the repetition rate of the illumination provided to the target material is in a range from five to fifty kilohertz.

In some embodiments, the wavelength of emission from any of pulsed lasers 113A and 113B is approximately one micrometer or less. In general, a pulsed laser of LPP 110 is any solid state laser (e.g., Nd:YAG, Er:YAG, Yb:YAG, Ti:Sapphire, Nd:Vanadate, or others) or a gas-discharge laser (e.g., an excimer laser). In some embodiments, the total average power of each pulsed laser is approximately one kilowatt or less.

In a further aspect, plasma chamber 153 is filled with a buffer gas 123. In a preferred embodiment, buffer gas 123 is Xenon gas. Xenon gas 123 absorbs very little of the X-ray radiation generated by the plasma and is transparent to laser generated optical radiation. In some examples, Xenon gas 123 absorbs less than $10^{-5}$ of the X-ray radiation generated by plasma 115 for 1,000 torr-cm of path length of Xenon gas. Furthermore, Xenon is a noble gas that does not condense on x-ray filter 117.

In another further aspect, the Xenon buffer gas is maintained at a pressure in a range between 5 and 200 Torr. Maintaining the Xenon gas within this pressure range provides a suitable environment for Xenon droplet formation. Furthermore, Xenon buffer gas maintained at a pressure in a range between 5 and 200 Torr thermalizes energetic Xenon ions and electrons generated by plasma 115 including substantially all Xenon ions generated by plasma 115 within a distance of approximately 10 centimeters or less from plasma 115.

If the pressure of the Xenon buffer gas is too low, evaporation of the liquid Xenon prevents the breakup of the Xenon stream emitted by droplet generator 111 into discrete droplets. Moreover, if the pressure of the Xenon buffer gas is too low, the Xenon buffer gas is not able to stop all energetic Xenon ions created by plasma 115 at distances of approximately 10 centimeters or less.

Optical elements such as laser illumination window 116, collector 118, and x-ray filter 117 are sensitive to material deposition from plasma 115. In some embodiments, the distance between plasma 115 and the optical elements of plasma chamber 153 (e.g., windows 116 and 117 and collector 118) is at least ten centimeters. In this manner Xenon gas 123 protects illumination window 116, collector 118, and x-ray filter 117 from contamination by material generated by the plasma 115.

As depicted in FIG. 1, LPP light source 110 includes a droplet generator that generates a sequence of droplets of liquid or solid Xenon that are illuminated by pulsed laser illumination sources 113A and 113B. In some other embodiments, the Xenon target material is provided to the focal point of the laser illumination light as a solid Xenon layer disposed on a cryogenically cooled rotating drum (i.e., frozen layer of Xenon). In this manner the plasma is generated at the surface of the drum and the emitted X-ray radiation is collected for semiconductor metrology. In these embodiments, the cryogenically cooled drum is continuously rotated to deliver solid Xenon target material to the focal point of the laser illumination light. As described hereinbefore, the laser spot incident on the Xenon target is less than 10 micrometers in diameter.

The interaction of a pulse of excitation light with the Xenon target (e.g., Xenon droplet or Xenon sheet) causes the Xenon to ionize to form a plasma 115 that emits an illumination light 124 with very high brightness. In a preferred embodiment, the brightness of plasma 115 is greater than $10^{14}$ photons/(sec)·(mm2)·(mrad2). The illumination light comprises light having energy in a range from about 25,000 eV to about 30,000 eV.

The illumination light 124 is collected by collector 118 and focused onto specimen 150 under measurement. In the embodiment depicted in FIG. 1, collector 118 gathers illumination light 124 emitted by plasma 115 and directs illumination light 124 through window 117. In some embodiments, window 117 is an x-ray filter configured to be transparent to x-ray radiation within a range of wavelengths of interest, and substantially absorb radiation outside of the range of wavelengths of interest.

Collector 120 may be any suitable shape to gather illumination light generated from plasma 115. Suitable examples include elliptical collectors and collectors with multiple surface contours. Exemplary techniques for collecting light emitted from a plasma are described in U.S. Pat. No. 7,705,331, issued Apr. 27, 2010, to KLA-Tencor Technologies Corp., the entirety of which is incorporated herein by reference.

In the embodiment depicted in FIG. 1, illumination light 124 exits plasma chamber 153 via window 117 and is redirected toward specimen 150 by mirror 125. In addition, illumination optics 126 are employed to further shape illumination light 124 incident on specimen 150 over measurement area 129. Illumination optics 126 may include a hollow optical homogenizer or a reflective light tube to efficiently transmit illumination light to a specimen. In some other embodiments, an illumination and collection objective may be employed. In these embodiments, illumination optics 126 transmit illumination light to the objective.

The illumination of specimen 150 over measurement area 129 causes light to be scattered from specimen 150. Scattered light 128 is detected by detector 127. Detector 127 generates signals 151 indicative of the scattered light incident on the active area(s) of detector 127. Detector 127 communicates signals 151 to computing system 130 for analysis. Computing system 130 determines properties of the specimen 150 based at least in part on the acquired signals 151.

In another further aspect, computing system 130 is configured to generate a structural model (e.g., geometric model, material model, or combined geometric and material model) of a measured structure of a specimen, generate a x-ray scatterometry response model that includes at least one geometric parameter from the structural model, and resolve at least one specimen parameter value by performing a fitting analysis of x-ray scatterometry measurement data with the x-ray scatterometry response model. The analysis engine is used to compare the simulated x-ray scatterometry signals with measured data thereby allowing the determination of geometric as well as material properties such as electron density of the sample. In the embodiment depicted in FIG. 1, computing system 130 is configured as a model building and analysis engine configured to implement model building and analysis functionality as described herein.

Figure 2:
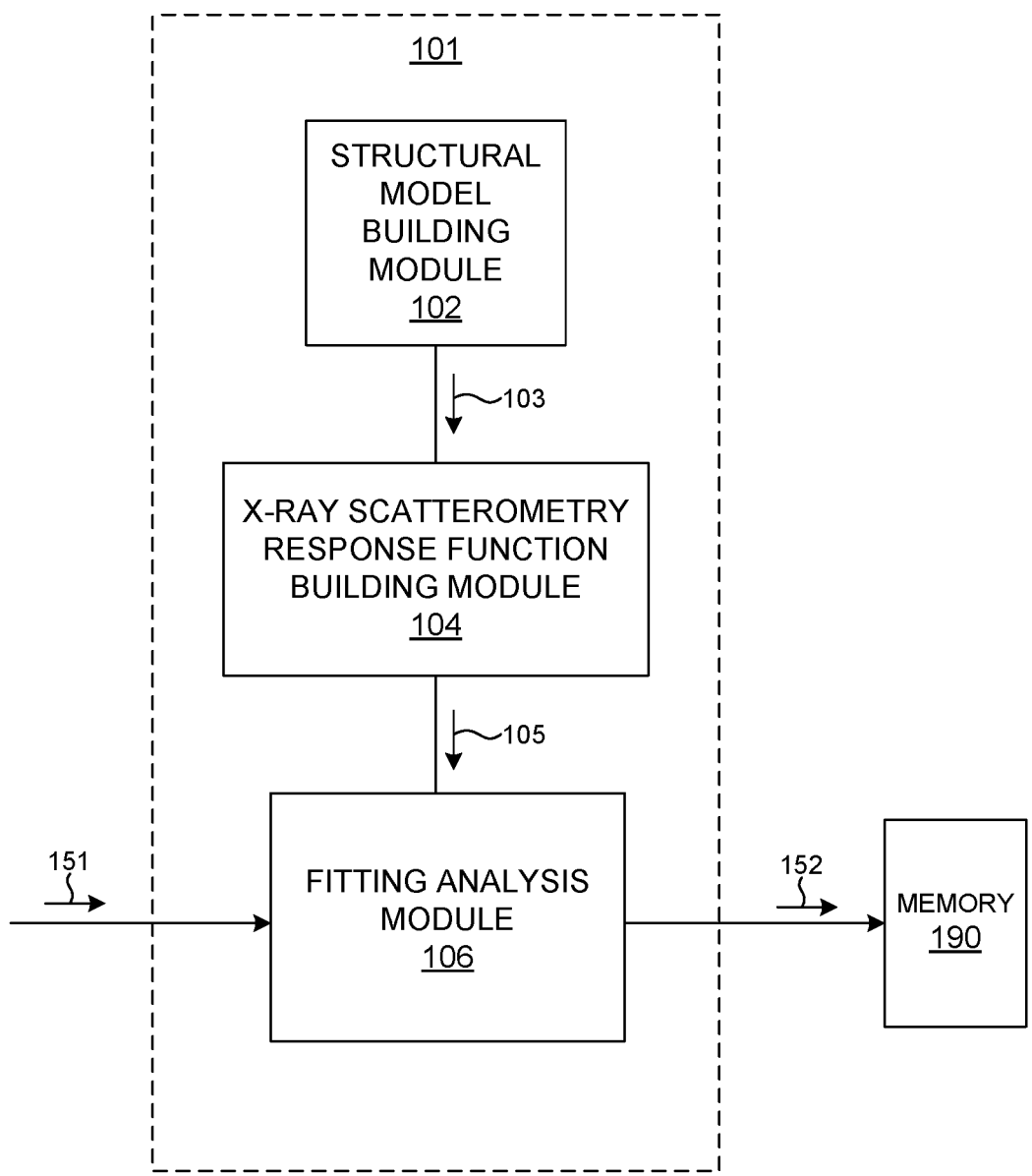
FIG. 2 is a simplified diagram illustrative of an exemplary model building and analysis engine.

FIG. 2 is a diagram illustrative of an exemplary model building and analysis engine 101 implemented by computing system 130. As depicted in FIG. 2, model building and analysis engine 101 includes a structural model building module 102 that generates a structural model 103 of a measured structure of a specimen. In some embodiments, structural model 103 also includes material properties of the specimen. The structural model 103 is received as input to x-ray scatterometry response function building module 104. X-ray scatterometry response function building module 104 generates a full beam x-ray scatterometry response function model 105 based at least in part on the structural model 103. In some examples, the x-ray scatterometry response function model 105 is based on x-ray form factors, $$F(\vec{q}) = \int \rho(\vec{r}) e^{-i\vec{q}\cdot\vec{r}} d\vec{r} \quad (1)$$

where F is the form factor, q is the scattering vector, and $\rho(r)$ is the electron density of the specimen in spherical coordinates as described in equation (1). The x-ray scattering intensity is then given by equation (2).

$$I(\vec{q}) = F^*F. \quad (2)$$

X-ray scatterometry response function model 105 is received as input to fitting analysis module 106. The fitting analysis module 106 compares the modeled x-ray scatterometry response with the corresponding measured data to determine geometric as well as material properties of the specimen.

In some examples, the fitting of modeled data to experimental data is achieved by minimizing a chi-squared value. For example, for x-ray scatterometry measurements, a chi-squared value can be defined as $$\chi^2_{SAXS} = \frac{1}{N_{SAXS}} \sum_j^{N_{SAXS}} \frac{\left(S_j^{SAXS\ model}(v_1, \ldots, v_L) - S_j^{SAXS\ experiment}\right)^2}{\sigma^2_{SAXS,j}} \quad (3)$$

where, $S_j^{SAXS\ experiment}$ is the measured x-ray scatterometry signals 151 in the "channel" j, where the index j describes a set of system parameters such as diffraction order, energy, angular coordinate, etc. $S_j^{SAXS\ model}(v_1, \ldots, v_L)$ is the modeled x-ray scatterometry signal $S_j$ for the "channel" j, evaluated for a set of structure (target) parameters $v_1, \ldots, v_L$, where these parameters describe geometric (CD, sidewall angle, overlay, etc.) and material (electron density, etc.). $\sigma_{SAXS,j}$ is the uncertainty associated with the jth channel. $N_{SAXS}$ is the total number of channels in the x-ray metrology. L is the number of parameters characterizing the metrology target.

Equation (3) assumes that the uncertainties associated with different channels are uncorrelated. In examples where the uncertainties associated with the different channels are correlated, a covariance between the uncertainties, can be calculated. In these examples a chi-squared value for full beam x-ray scatterometry measurements can be expressed as $$\chi^2_{SAXS} = \frac{1}{N_{SAXS}} \left(\vec{S}_j^{SAXS.\ model}(v_1, ..., v_M) - \vec{S}_j^{SAXS.\ experiment}\right)^T \quad (4)$$
$$V_{SAXS}^{-1}\left(\vec{S}_j^{SAXS.\ model}(v_1, ..., v_M) - \vec{S}_j^{SAXS.\ experiment}\right)$$

where, $V_{SAXS}$ is the covariance matrix of the SAXS channel uncertainties, and T denotes the transpose.

In some examples, fitting analysis module 106 resolves at least one specimen parameter value 152 by performing a fitting analysis on x-ray scatterometry measurement data 151 with the x-ray scatterometry response model 105. In some examples, $\chi^2_{SAXS}$ is optimized. In the embodiment depicted in FIG. 1, the determined values 152 are stored in memory 190.

As described hereinbefore, the fitting of x-ray scatterometry data is achieved by minimization of chi-squared values. However, in general, the fitting of full beam x-ray scatterometry data may be achieved by other functions.

The fitting of x-ray scatterometry metrology data is advantageous for any type of x-ray scatterometry technology that provides sensitivity to geometric and/or material parameters of interest. Specimen parameters can be deterministic (e.g., CD, SWA, overlay, etc.) or statistical (e.g., rms height of sidewall roughness, roughness correlation length, etc.) as long as proper models describing x-ray scatterometry beam interaction with the specimen are used.

In general, computing system 130 is configured to access model parameters in real-time, employing Real Time Critical Dimensioning (RTCD), or it may access libraries of pre-computed models for determining a value of at least one specimen parameter value associated with the specimen 150. In general, some form of CD-engine may be used to evaluate the difference between assigned CD parameters of a specimen and CD parameters associated with the measured specimen. Exemplary methods and systems for computing specimen parameter values are described in U.S. Pat. No. 7,826,071, issued on Nov. 2, 2010, to KLA-Tencor Corp., the entirety of which is incorporated herein by reference.

In some examples, model building and analysis engine 101 improves the accuracy of measured parameters by any combination of feed sideways analysis, feed forward analysis, and parallel analysis. Feed sideways analysis refers to taking multiple data sets on different areas of the same specimen and passing common parameters determined from the first dataset onto the second dataset for analysis. Feed forward analysis refers to taking data sets on different specimens and passing common parameters forward to subsequent analyses using a stepwise copy exact parameter feed forward approach. Parallel analysis refers to the parallel or concurrent application of a non-linear fitting methodology to multiple datasets where at least one common parameter is coupled during the fitting.

Multiple tool and structure analysis refers to a feed forward, feed sideways, or parallel analysis based on regression, a look-up table (i.e., "library" matching), or another fitting procedure of multiple datasets. Exemplary methods and systems for multiple tool and structure analysis is described in U.S. Pat. No. 7,478,019, issued on Jan. 13, 2009, to KLA-Tencor Corp., the entirety of which is incorporated herein by reference.

In one further aspect, metrology tool 100 includes a computing system (e.g., computing system 130) configured to implement beam control functionality as described herein. In the embodiment depicted in FIG. 1, computing system 130 is configured as a beam controller operable to control any of the illumination properties such as intensity, divergence, spot size, polarization, spectrum, and positioning of the incident illumination beam 124.

As illustrated in FIG. 1, computing system 130 is communicatively coupled to detector 127. Computing system 130 is configured to receive measurement data 151 from detector 127. In one example, measurement data 151 includes an indication of the measured response of the specimen (i.e., intensities of the diffraction orders). Based on the distribution of the measured response on the surface of detector 127, the location and area of incidence of illumination beam 124 on specimen 150 is determined by computing system 130. In one example, pattern recognition techniques are applied by computing system 130 to determine the location and area of incidence of illumination beam 124 on specimen 150 based on measurement data 151. In some examples, computing system 130 communicates a command signal (not shown) to illumination optics 126 to select the desired illumination beam energy and redirect and reshape illumination beam 124 such that incident illumination beam 124 arrives at the desired location and angular orientation with respect to specimen 150. In some other examples, computing system 130 communicates a command signal 137 to wafer positioning system 140 to position and orient specimen 150 such that incident illumination beam 124 arrives at the desired location and angular orientation with respect to specimen 150. In some other examples, computing system 130 communicates command signals 135 and 136 to LPP light source 110 to select the desired illumination wavelength and redirect and reshape illumination beam 124 such that incident illumination beam 124 arrives at the desired location and angular orientation with respect to specimen 150.

In some embodiments, it is desirable to perform measurements at different orientations. This increases the precision and accuracy of measured parameters and reduces correlations among parameters by extending the number and diversity of data sets available for analysis to include a variety of large-angle, out of plane orientations. Measuring specimen parameters with a deeper, more diverse data set also reduces correlations among parameters and improves measurement accuracy. For example, in a normal orientation, x-ray scatterometry is able to resolve the critical dimension of a feature, but is largely insensitive to sidewall angle and height of a feature. However, by collecting measurement data over a broad range of out of plane angular positions, the sidewall angle and height of a feature can be resolved.

As illustrated in FIG. 1, metrology tool 100 includes a specimen positioning system 140 configured to both align specimen 150 and orient specimen 150 over a large range of out of plane angular orientations with respect the scatterometer. In other words, specimen positioning system 140 is configured to rotate specimen 150 over a large angular range about one or more axes of rotation aligned in-plane with the surface of specimen 150. In some embodiments, specimen positioning system 140 is configured to rotate specimen 150 within a range of at least 90 degrees about one or more axes of rotation aligned in-plane with the surface of specimen 150. In some embodiments, specimen positioning system is configured to rotate specimen 150 within a range of at least 60 degrees about one or more axes of rotation aligned in-plane with the surface of specimen 150. In some other embodiments, specimen positioning system 140 is configured to rotate specimen 150 within a range of at least one degree about one or more axes of rotation aligned in-plane with the surface of specimen 101. In this manner, angle resolved measurements of specimen 150 are collected by metrology system 100 over any number of locations on the surface of specimen 150. In one example, computing system 130 communicates command signals 137 to motion controller 145 of specimen positioning system 140 that indicate the desired position of specimen 150. In response, motion controller 145 generates command signals to the various actuators of specimen positioning system 140 to achieve the desired positioning of specimen 150.

By way of non-limiting example, as illustrated in FIG. 1, specimen positioning system 140 includes an edge grip chuck 141 to fixedly attach specimen 150 to specimen positioning system 140. A rotational actuator 142 is configured to rotate edge grip chuck 141 and the attached specimen 150 with respect to a perimeter frame 143. In the depicted embodiment, rotational actuator 142 is configured to rotate specimen 150 about the x-axis of the coordinate system 146 illustrated in FIG. 1. As depicted in FIG. 1, a rotation of specimen 150 about the z-axis is an in plane rotation of specimen 150. Rotations about the x-axis and the y-axis (not shown) are out of plane rotations of specimen 150 that effectively tilt the surface of the specimen with respect to the metrology elements of metrology system 100. Although it is not illustrated, a second rotational actuator is configured to rotate specimen 150 about the y-axis. A linear actuator 144 is configured to translate perimeter frame 143 in the x-direction. Another linear actuator (not shown) is configured to translate perimeter frame 143 in the y-direction. In this manner, every location on the surface of specimen 150 is available for measurement over a range of out of plane angular positions. For example, in one embodiment, a location of specimen 150 is measured over several angular increments within a range of −45 degrees to +45 degrees with respect to the normal orientation of specimen 150.

In general, specimen positioning system 140 may include any suitable combination of mechanical elements to achieve the desired linear and angular positioning performance, including, but not limited to goniometer stages, hexapod stages, angular stages, and linear stages.

In another further aspect, LPP light source 110 includes a gas recycle system 120 that recycles the evaporated Xenon back to the Xenon target generator (e.g., droplet generator 111). As depicted in FIG. 1, gas recycle system 120 receives a flow 119 of Xenon gas (e.g., evaporated Xenon) from plasma chamber 153. Since Xenon buffer gas 123 and evaporated Xenon (i.e., after heating by plasma 115) are indistinguishable, flow 119 includes Xenon employed as a buffer gas and Xenon vaporized by plasma 115. Gas recycle system 120 recovers the Xenon gas and transports recovered Xenon 121 to droplet generator 111 to be reused. In addition, gas recycle system 120 recovers the Xenon gas and transports recovered Xenon 122 back into plasma chamber 123.

As depicted in FIG. 1, system 100 includes two lasers focused on a droplet to generate plasma 115. However, system 100 may include one laser or more than two lasers. Each laser may be configured differently or the same. For example, the lasers may be configured to generate light having different characteristics that can be directed to a droplet at the same or different times. In another example, the lasers may be configured to direct light to a droplet from the same or different directions. Exemplary techniques for directing excitation light to a target are described in the aforementioned U.S. Pat. No. 7,705,331, the entirety of which is incorporated herein by reference.

FIG. 1 depicts a transmissive small angle x-ray scatterometry (SAXS) system in one embodiment. However, other x-ray based metrology systems employing a LPP light source as described herein may be contemplated within the scope of this patent document. In some examples, a coherent diffractive imaging (CDI) based metrology system includes a LPP light source as described herein. In other examples, a LPP light source may be employed as part of an imaging x-ray metrology system.

In some embodiments, an imaging objective directs collected light to a detector. In some embodiments, illumination light generated by light source 110 is transmitted by illumination optics 126 to an objective. In some embodiments the illumination optics 126 and the imaging objective may be comprised of primarily the same elements and be substantially the same. In some other embodiments, illumination light generated by light source 110 is transmitted by illumination optic 126 directly to specimen 150 without first being directed through the elements of the imaging objective. In response to the illumination light incident on specimen 150, light from specimen 150 is collected, magnified, and directed to a detector by an imaging objective.

In some embodiments, an imaging objective designed with an adequate field of view is employed. The light path through the objective should preferably include a minimum number of interactions with reflective surfaces to minimize absorption losses associated with each interaction. Exemplary designs for an objective with all reflective components using a four mirror, four pass design are described in U.S. Pat. No. 7,351,980, issued Apr. 1, 2008, to KLA-Tencor Technologies Corp., the entirety of which is incorporated herein by reference. In addition, exemplary designs for an objective with all reflective components using a four mirror, six pass design is described in U.S. Patent Publication No. 2010/0188738 A1, the entirety of which is incorporated herein by reference.

Illumination direction affects how a structure on a wafer is resolved by a metrology system such as metrology system 100. In some embodiments, optical configurations discussed may have non-uniform optical properties in one of more of the reflective elements that are specifically optimized for illumination purposes. For example, coatings may be optimized to increase the coating durability due to the high exposure energy in the illumination path.

Figure 3:
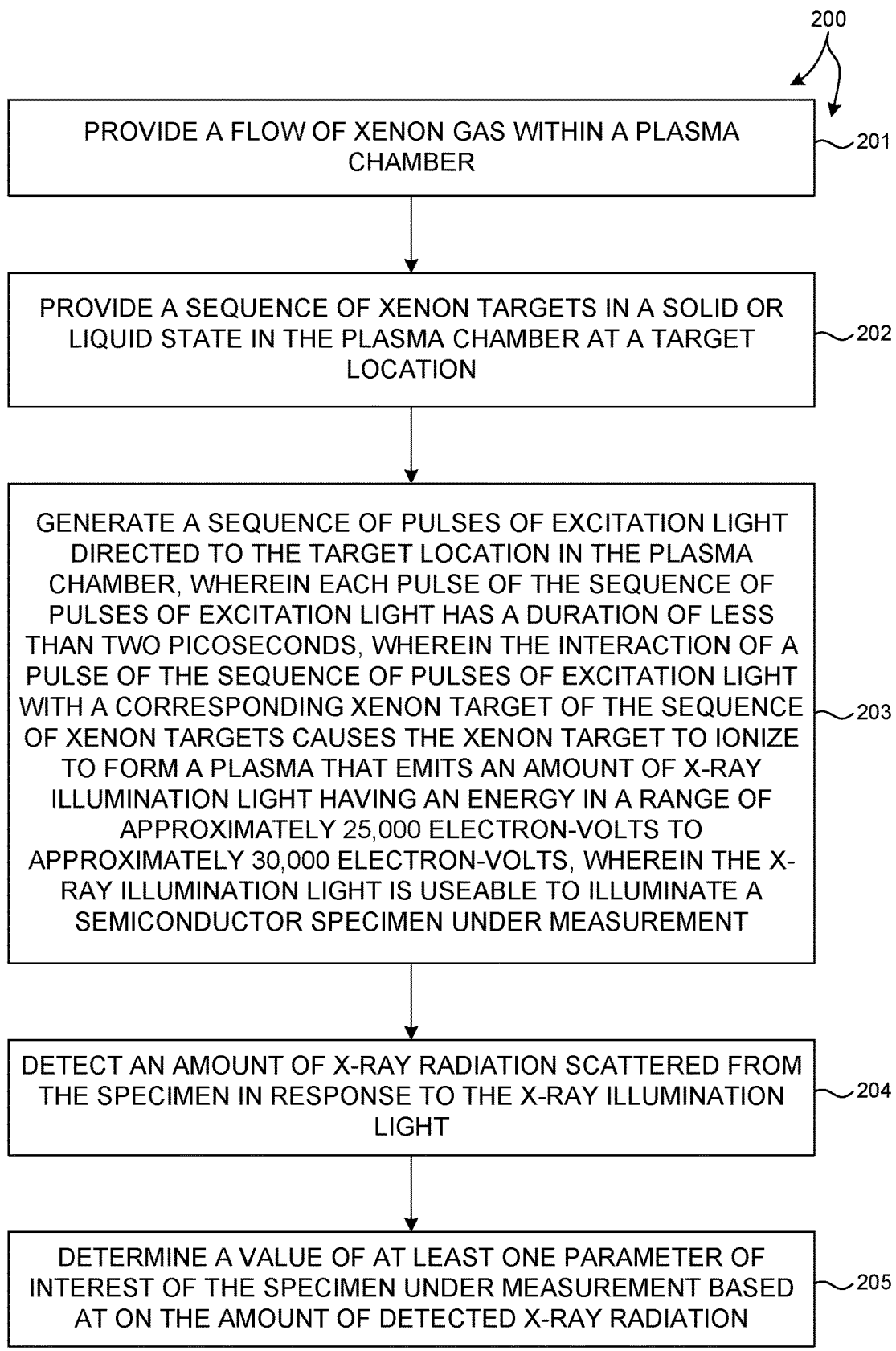
FIG. 3 is a flowchart of a method of generating hard x-ray illumination light to a semiconductor specimen under measurement.

FIG. 3 illustrates a method 200 suitable for generating hard x-ray illumination light for x-ray based metrology in accordance with at least one inventive aspect. It is recognized that data processing elements of method 200 may be carried out via a pre-programmed algorithm stored as part of program instructions 134 and executed by one or more processors of computing system 130. While the following description is presented in the context of system 100 depicted in FIG. 1, it is recognized herein that the particular structural aspects of system 100 do not represent limitations and should be interpreted as illustrative only.

In block 201, a flow of Xenon gas is provided within a plasma chamber.

In block 202, a sequence of Xenon targets in a solid or liquid state is provided in the plasma chamber at a target location.

In block 203, a sequence of pulses of excitation light directed to the target location in the plasma chamber is generated. Each pulse of the sequence of pulses of excitation light has a duration of less than two picoseconds. The interaction of a pulse of the sequence of pulses of excitation light with a corresponding Xenon target of the sequence of Xenon targets causes the Xenon target to ionize to form a plasma that emits an amount of X-ray illumination light having an energy in a range of approximately 25,000 electron-volts to approximately 30,000 electron-volts. The resulting X-ray illumination light is useable to illuminate a semiconductor specimen under measurement.

In block 204, an amount of X-ray radiation scattered from the specimen in response to the X-ray illumination light is detected.

In block 205, a value of at least one parameter of interest of the specimen under measurement is determined based at on the amount of detected X-ray radiation.

It should be recognized that the various steps described throughout the present disclosure may be carried out by a single computer system 130 or, alternatively, a multiple computer system 130. Moreover, different subsystems of the system 100, such as the specimen positioning system 140, gas recycle system 120, droplet generator 111, laser 113, and detector 127, may include a computer system suitable for carrying out at least a portion of the steps described herein. Therefore, the aforementioned description should not be interpreted as a limitation on the present invention but merely an illustration. Further, the one or more computing systems 130 may be configured to perform any other step(s) of any of the method embodiments described herein.

In addition, the computer system 130 may be communicatively coupled to the specimen positioning system 140, gas recycle system 120, droplet generator 111, laser 113, and detector 127 in any manner known in the art. For example, the one or more computing systems 130 may be coupled to computing systems associated with the specimen positioning system 140, gas recycle system 120, droplet generator 111, laser 113, and detector 127, respectively. In another example, any of the specimen positioning system 140, gas recycle system 120, droplet generator 111, laser 113, and detector 127, may be controlled directly by a single computer system coupled to computer system 130.

The computer system 130 of the system 100 may be configured to receive and/or acquire data or information from the subsystems of the system (e.g., specimen positioning system 140, gas recycle system 120, droplet generator 111, laser 113, and detector 127, and the like) by a transmission medium that may include wireline and/or wireless portions. In this manner, the transmission medium may serve as a data link between the computer system 130 and other subsystems of the system 100.

Computer system 130 of the system 100 may be configured to receive and/or acquire data or information (e.g., modeling inputs, modeling results, etc.) from other systems by a transmission medium that may include wireline and/or wireless portions. In this manner, the transmission medium may serve as a data link between the computer system 130 and other systems (e.g., memory on-board system 100, external memory, or external systems). For example, the computing system 130 may be configured to receive measurement data (e.g., signals 151) from a storage medium (i.e., memory 132) via a data link. For instance, measurement results obtained using detector 127 may be stored in a permanent or semi-permanent memory device (e.g., memory 132). In this regard, the measurement results may be imported from on-board memory or from an external memory system. Moreover, the computer system 130 may send data to other systems via a transmission medium. For instance, parameter values 152 determined by computer system 130 may be stored in a permanent or semi-permanent memory device (e.g., memory 190). In this regard, measurement results may be exported to another system.

Computing system 130 may include, but is not limited to, a personal computer system, mainframe computer system, workstation, image computer, parallel processor, or any other device known in the art. In general, the term "computing system" may be broadly defined to encompass any device having one or more processors, which execute instructions from a memory medium.

Program instructions 134 implementing methods such as those described herein may be transmitted over a transmission medium such as a wire, cable, or wireless transmission link. For example, as illustrated in FIG. 10, program instructions stored in memory 132 are transmitted to processor 131 over bus 133. Program instructions 134 are stored in a computer readable medium (e.g., memory 132). Exemplary computer-readable media include read-only memory, a random access memory, a magnetic or optical disk, or a magnetic tape.

Metrology techniques as described herein may be used to determine characteristics of semiconductor structures. Exemplary structures include, but are not limited to, Fin-FETs, low-dimensional structures such as nanowires or graphene, sub 10 nm structures, thin films, lithographic structures, through silicon vias (TSVs), memory structures such as DRAM, DRAM 4F2, FLASH and high aspect ratio memory structures, such as 3D-NAND structures. Exemplary structural characteristics include, but are not limited to, geometric parameters such as line edge roughness, line width roughness, pore size, pore density, side wall angle, profile, film thickness, critical dimension, pitch, and material parameters such as electron density, crystalline grain structure, morphology, orientation, stress, strain, elemental identification, and material composition.

In some embodiments, the techniques described herein may be implemented as part of a fabrication process tool. Examples of fabrication process tools include, but are not limited to, lithographic exposure tools, film deposition tools, implant tools, and etch tools. In this manner, the results of the temperature measurements are used to control a fabrication process.

Various embodiments are described herein for a semiconductor processing system (e.g., an inspection system, a metrology system, or a lithography system) that may be used for processing a specimen. The term "specimen" is used herein to refer to a wafer, a reticle, or any other sample that may be processed (e.g., printed or inspected for defects) by means known in the art.

As used herein, the term "specimen" generally refers to a wafer. However, it is to be understood that the methods and systems described herein may be used to provide illumination of any other specimen known in the art.

As used herein, the term "wafer" generally refers to substrates formed of a semiconductor or non-semiconductor material. Examples include, but are not limited to, monocrystalline silicon, gallium arsenide, and indium phosphide. Such substrates may be commonly found and/or processed in semiconductor fabrication facilities. In some cases, a wafer may include only the substrate (i.e., bare wafer). Alternatively, a wafer may include one or more layers of different materials formed upon a substrate. One or more layers formed on a wafer may be "patterned" or "unpatterned." For example, a wafer may include a plurality of dies having repeatable pattern features.

A "reticle" may be a reticle at any stage of a reticle fabrication process, or a completed reticle that may or may not be released for use in a semiconductor fabrication facility. A reticle, or a "mask," is generally defined as a substantially transparent substrate having substantially opaque regions formed thereon and configured in a pattern. The substrate may include, for example, a glass material such as quartz. A reticle may be disposed above a resist-covered wafer during an exposure step of a lithography process such that the pattern on the reticle may be transferred to the resist.

One or more layers formed on a wafer may be patterned or unpatterned. For example, a wafer may include a plurality of dies, each having repeatable pattern features. Formation and processing of such layers of material may ultimately result in completed devices. Many different types of devices may be formed on a wafer, and the term wafer as used herein is intended to encompass a wafer on which any type of device known in the art is being fabricated.

In one or more exemplary embodiments, the functions described may be implemented in hardware, software, firmware, or any combination thereof. If implemented in software, the functions may be stored on or transmitted over as one or more instructions or code on a computer-readable medium. Computer-readable media includes both computer storage media and communication media including any medium that facilitates transfer of a computer program from one place to another. A storage media may be any available media that can be accessed by a general purpose or special purpose computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above should also be included within the scope of computer-readable media.

Although certain specific embodiments are described above for instructional purposes, the teachings of this patent document have general applicability and are not limited to the specific embodiments described above. Accordingly, various modifications, adaptations, and combinations of various features of the described embodiments can be practiced without departing from the scope of the invention as set forth in the claims.

What is claimed is:

1. A laser produced plasma light source, comprising:
    a plasma chamber including a flow of Xenon gas within the plasma chamber, wherein a pressure of the Xenon gas within the plasma chamber is within a range between 5 torr and 200 torr;
    a Xenon target generator that provides a sequence of Xenon targets in a solid or liquid state in the plasma chamber at a target location; and
    one or more pulsed laser sources that generate a sequence of pulses of excitation light directed to the target location in the plasma chamber, wherein each pulse of the sequence of pulses of excitation light has a duration of less than two picoseconds, wherein the interaction of a pulse of the sequence of pulses of excitation light with a corresponding Xenon target of the sequence of Xenon targets causes the Xenon target to ionize to form a plasma that emits an amount of X-ray illumination light having an energy in a range of approximately 25,000 electron-volts to approximately 30,000 electron-volts, wherein the X-ray illumination light is useable to illuminate a semiconductor specimen under measurement.

2. The laser produced plasma light source of claim 1, wherein the Xenon target generator comprises:
    a droplet generator that dispenses a sequence of droplets of Xenon in a solid or liquid state into the plasma chamber.

3. The laser produced plasma light source of claim 1, wherein the Xenon target generator comprises:
    a cryogenically cooled drum disposed in the plasma chamber, the cryogenically cooled drum having a solid layer of Xenon material disposed on an outward facing surface of the cryogenically cooled drum at a focal point of each pulse of excitation light.

4. The laser produced plasma light source of claim 1, wherein the one or more pulsed laser sources includes at least two pulse laser sources that simultaneously emit pulses of excitation light.

5. The laser produced plasma light source of claim 1, wherein the one or more pulsed laser sources includes at least two pulse laser sources that sequentially emit pulses of excitation light.

6. The laser produced plasma light source of claim 1, further comprising:
    a gas recycling system configured to recover an amount of Xenon gas from the plasma chamber and provide a first amount of the recovered Xenon gas to the Xenon target generator.

7. The laser produced plasma light source of claim 6, the gas recycling system further configured to provide a second amount of the recovered Xenon gas to the plasma chamber.

8. The laser produced plasma light source of claim 6, wherein the amount of recovered Xenon gas includes an amount of evaporated Xenon target material.

9. The laser produced plasma light source of claim 1, wherein a distance from a window of the plasma chamber and the plasma is at least 10 centimeters.

10. The laser produced plasma light source of claim 1, wherein each of the sequence of droplets of the feed material is less than 50 micrometers in diameter.

11. The laser produced plasma light source of claim 1, wherein a brightness of the plasma is greater than $10^{14}$ photons/(sec)·(mm$^2$)·(mrad$^2$).

12. The laser produced plasma light source of claim 1, further comprising:
    a collector that gathers an amount of the illumination light emitted by the plasma and directs the amount of illumination light through an X-ray window of the plasma chamber.

13. A metrology system comprising:
    a laser produced plasma light source comprising:
    a plasma chamber including a flow of Xenon gas within the plasma chamber;
    a Xenon target generator that provides a sequence of Xenon targets in a solid or liquid state in the plasma chamber at a target location;

one or more pulsed laser sources that generate a sequence of pulses of excitation light directed to the target location in the plasma chamber, wherein each pulse of the sequence of pulses of excitation light has a duration of less than two picoseconds, wherein the interaction of a pulse of the sequence of pulses of excitation light with a corresponding Xenon target of the sequence of Xenon targets causes the Xenon target to ionize to form a plasma that emits an amount of X-ray illumination light having an energy in a range of approximately 25,000 electron-volts to approximately 30,000 electron-volts; and a collector that gathers the X-Ray illumination light emitted by the plasma and directs the X-ray illumination light toward a specimen under measurement;

an x-ray detector that detects an amount of X-ray radiation scattered from the specimen in response to the X-Ray illumination light incident on the specimen; and a computing system configured to determine a value of a parameter of interest associated with a model of the specimen based on the detected amount of X-ray radiation.

14. The metrology system of claim 13, wherein the metrology system is configured as any of a transmissive small angle x-ray scatterometry system.

15. The metrology system of claim 13, wherein a distance from a window of the plasma chamber and the plasma is at least 10 centimeters.

16. The metrology system of claim 13, wherein a pressure of the Xenon gas within the plasma chamber is within a range between 5 torr and 200 torr.

17. The metrology system of claim 13, further comprising:

a gas recycling system configured to recover an amount of Xenon gas from the plasma chamber and provide a first amount of the recovered Xenon gas to the Xenon target generator.

18. A method comprising:

providing a flow of Xenon gas within a plasma chamber;

providing a sequence of Xenon targets in a solid or liquid state in the plasma chamber at a target location;

generating a sequence of pulses of excitation light directed to the target location in the plasma chamber, wherein each pulse of the sequence of pulses of excitation light has a duration of less than two picoseconds, wherein the interaction of a pulse of the sequence of pulses of excitation light with a corresponding Xenon target of the sequence of Xenon targets causes the Xenon target to ionize to form a plasma that emits an amount of X-ray illumination light having an energy in a range of approximately 25,000 electron-volts to approximately 30,000 electron-volts, wherein the X-ray illumination light is useable to illuminate a semiconductor specimen under measurement;

detecting an amount of X-ray radiation scattered from the specimen in response to the X-ray illumination light; and determining a value of at least one parameter of interest of the specimen under measurement based at on the amount of detected X-ray radiation.

19. The method of claim 18, further comprising:

recovering an amount of Xenon gas from the plasma chamber; and providing a first amount of the recovered Xenon gas to a Xenon target generator that provides the sequence of Xenon targets.

\* \* \* \* \*